(12) United States Patent
Duke et al.

(10) Patent No.: US 6,344,902 B1
(45) Date of Patent: Feb. 5, 2002

(54) APPARATUS AND METHOD FOR USING FEEDBACK AND FEEDFORWARD IN THE GENERATION OF PRESENTATION IMAGES IN A DISTRIBUTED DIGITAL IMAGE PROCESSING SYSTEM

(75) Inventors: Charles B. Duke, Webster; Lingappa K. Mestha; Marty E. Banton, both of Fairport; Tracy E. Thieret, Webster; Edward J. Solcz, Fairport, all of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/232,465
(22) Filed: Jan. 19, 1999
(51) Int. Cl.$^7$ ............................................... B41B 15/00
(52) U.S. Cl. .......................................... 358/1.9; 399/1
(58) Field of Search ......................... 358/1.9, 1.1, 1.13; 399/8, 15, 1, 9, 11

(56) References Cited

U.S. PATENT DOCUMENTS

| | | |
|---|---|---|
| 3,870,968 A | 3/1975 | Vosteen et al. |
| 4,205,257 A | 5/1980 | Ogura et al. |
| 4,403,866 A | 9/1983 | Falcoff et al. |
| 4,724,461 A | 2/1988 | Rushing |
| 4,853,639 A | 8/1989 | Vosteen et al. |
| 4,887,217 A | 12/1989 | Sherman et al. |
| 5,003,327 A | 3/1991 | Theodoulou et al. |
| 5,045,882 A | 9/1991 | Roehrs et al. |
| 5,243,383 A | 9/1993 | Parisi |
| 5,272,518 A * | 12/1993 | Vincent ...................... 356/405 |
| 5,481,380 A | 1/1996 | Bestmann |
| 5,500,801 A * | 3/1996 | Loffler ........................ 364/469 |
| 5,544,258 A | 8/1996 | Levien |
| 5,559,173 A | 9/1996 | Campo et al. |
| 5,662,044 A | 9/1997 | Loffler et al. |
| 5,664,072 A | 9/1997 | Ueda et al. |
| 5,708,916 A | 1/1998 | Mestha |
| 5,717,978 A | 2/1998 | Mestha |
| 5,734,407 A | 3/1998 | Yamada et al. |
| 5,748,221 A | 5/1998 | Castelli et al. |
| 5,749,019 A | 5/1998 | Mestha |
| 5,749,021 A | 5/1998 | Mestha |
| 5,754,918 A | 5/1998 | Mestha et al. |
| 5,812,903 A | 9/1998 | Yamada et al. |
| 5,822,079 A | 10/1998 | Okuna et al. |
| 5,828,781 A * | 10/1998 | Nakano ...................... 382/167 |
| 5,884,118 A | 3/1999 | Mestha et al. |
| 6,046,820 A * | 4/2000 | Konishi ...................... 358/1.9 |
| 6,157,790 A * | 12/2000 | Noguchi ...................... 399/15 |

FOREIGN PATENT DOCUMENTS

JP    4-314768 A    11/1992

OTHER PUBLICATIONS

"Color Technology for Imaging Devices," Henry Kang, pp. 318–327.
"Miniature Lights for Miniature Spectrometers," Ocean Optics, Inc.,.
"Sequential Linear Interpolation of Multidimensional Functions," James Z. Chang et al., IEEE Transactions on Image Processing, vol. 6, No. 9, Sep. 1997.

* cited by examiner

Primary Examiner—Kimberly A. Williams
(74) Attorney, Agent, or Firm—Oliff & Berridge, PLC

(57) ABSTRACT

A method and apparatus for using feedback and feedforward in generating predictable, reproducible and pleasing images in a distributed digital image processing system monitors presentation images and provides feedback to a customer that assembled the original image. The originating customer can view the image as it appears on a remote output device and/or adjust the image so that the presentation image will match the image appearing on the image originating device. The system can also automatically adjust the digital images as they are processed by the system to insure that a remotely outputted presentation image matches the original image on the image originating device or on a local output device proximal with the image originating device.

33 Claims, 2 Drawing Sheets

APPARATUS AND METHOD FOR USING FEEDBACK AND FEEDFORWARD IN THE GENERATION OF PRESENTATION IMAGES IN A DISTRIBUTED DIGITAL IMAGE PROCESSING SYSTEM

BACKGROUND OF THE INVENTION

1. Field of the Invention

This invention relates to the generation of presentation images in a distributed digital image processing system. In particular, this invention is directed to the use of feedback and feedforward in generating predictable, reproducible and aesthetically pleasing images in a distributed digital image processing system.

2. Description of the Related Art

Distributed digital image processing systems provide a method for generating an image from an image originating device and distributing the image to output devices in both proximal and remote locatings. However, in conventional distributed digital image processing systems, problems arising with remote output devices, such as unsatisfactory image and/or color quality, output device inoperability, and output device resource deficiencies, are not readily detectable or correctable by a customer situated at the image originating device. For example, a customer generating an image (usually a digital image) at an image originating device is not immediately aware of the quality of that image as rendered on a remotely located display or printer. Due to the different configurations between various output devices, an image that appears pleasing at the image origination device or its associated local output device may not be accurately replicated by the desired remote output device. Such problems are quite common and cause significant inconvenience and dissatisfaction.

Unsatisfactory image and/or color quality can result from various system limitations. For example, discrepancies can arise when an image is converted from red, green and blue (RGB) components to cyan, magenta, yellow and black (CMYK) components. The system is also limited by the gamut of colors that can be produced by an given output device, which is often different than the gamut available on the image originating device. Further, the system is limited by the characteristics of each particular output device that cause it to output an unsatisfactory image. For example, the actual output colors may depend on the color of ink or toner, a low ink or toner state, and the like. Additionally, over time, the actual output of the output device may drift, i.e., deviate from predetermined optimum standards, due to various factors. These factors include environmental conditions, such as temperature, relative humidity, and the like, use patterns, the type of media used (such as different paper types, transparencies, and the like), variations in media, variations from original models used in initializing the hard copy output device, general wear, and the like. Thus, even though the output device may be capable of producing a presentation image that matches the original image, the desired image may still not be achieved due to the current status of the particular output device.

FIG. 1 shows an example of the connectivity of a simplified global distributed digital image processing system. As shown in FIG. 1, the distributed digital image processing system 10 includes an image originating device 20 having a display device (not shown), located, for example, in Webster, N.Y. A proximally located printer 25 is connected to the image originating device 20. The image originating device 20 is connected to a server, or set of connected servers, 30 that may or may not be located proximal the image originating device 20. Alternatively, a proximally located printer 26 could be connected to the image originating device 20 by way of the server, or set of connected servers, 30. Three remote printers 40 are connected to the central server, or set of connected servers, 30, and are located, for example, in Chicago, Tokyo and Budapest.

After a customer creates pleasing documents on the image originating device 20, the customer prints them on the local printer 25. The documents printed on the local printer 25 are usually satisfactory because, for example, the image originating device and/or the display device are calibrated for the local printer 25. The customer may then need to print the documents on one ore more of the remote printers 40. However, the actual image printed on the remote printers 40 may not appear as the customer expected. This may be due to, for example, poor color transformations between the work station, central server and remote printers, the requested colors being out of the gamut of the remote printers, the remote printers having different screening or halftoning, or the like.

In general, although not shown in FIG. 1, the conventional distributed digital image processing systems may include a large number of work stations 20 connected to the server 30. Although not shown in FIG. 1, a distributed digital image processing system may include a plurality of servers connected together to share the workload in performing requested operations. Similarly, although not shown in FIG. 1, a large number of output devices 40 are usually connected to the server, or set of connected servers, 30 are located at widely distributed locations. Each of the output devices 40 is a physical device, or hardware, that is capable of rendering images of documents and/or producing hard copy output of the print jobs received from the server, or set of connected servers, 30. The output devices include, but are not limited to video display, direct markers (i.e., direct marking devices, which include printers and other similar devices), and indirect markets (where the image is developed on an imaging member and subsequently transferred to an output substrate). The customers of the work station 20 include any end user.

SUMMARY OF THE INVENTION

There is the need for a distributed digital image processing system that dynamically monitors each aspect of an image processing operation to ensure that a desired remote output device will produce a presentation image substantially the same as an image created and viewed by a customer at an image originating device or its proximal local output device. Presently, the only reliable way to monitor the presentation images of remote output device is to travel to the location of each output device printer and observe the printed output or the displayed image, or to have a printed output delivered back to the customer at the image originating device. Thus, monitoring the presentation images output by the remotely located output devices is nearly impossible in a distributed digital image processing system, because traveling to the plurality of locations remote from the originating workstation is impractical, and delivering a printed output from a remote location to the customer requires some delay time to allow for courier or postal delivery.

This invention provides a method and apparatus for using feedback and feedforward in generating predictable, reproducible and pleasing images in a distributed digital image processing system.

In one aspect of this invention, a method and apparatus using feedback and feedforward in generating predictable, reproducible and pleasing images in a distributed digital image processing system monitors presentation images and provides feedback to a customer who assembled the original image, so as to allow the originating customer to view the image as it appears on a remote output device and/or to adjust the image so that the remotely outputted presentation image will match a locally outputted version of the image resident on the image originating device.

In another aspect of this invention, a method and apparatus using feedback and feedforward in generating predictable, reproducible and pleasing images in a distributed digital image processing system monitors presentation images and provides feedback to a system component, so as to allow for automatic adjustment of various digital representations of the assembled image to insure that a presentation image will match the corresponding image assembled on an image originating device.

In yet another aspect of this invention, an image originating device queries the remote output devices, via a central server or set of servers, to identify the capabilities and state each of remote output device. Printing application software residing on either the image originating device or the central server(s) adjusts the assembled image to create a presentation image on any or all of the remote output devices that matches a representation, displayed at the image originating device, of the image assembled at the image originating device in which the effects inherent in the output device (e.g., gamut, lighting) have been simulated. For purposes of this invention, the term "matches" means that the presentation image from an output device appears the same, within specified standards, as the simulated images at the large originating device.

These and other features and advantages of this invention are described or are apparent from the following detailed description or exemplary preferred embodiments.

BRIEF DESCRIPTION OF THE DRAWINGS

Exemplary preferred embodiments of this invention will be described in detail, with reference to the following drawings, wherein like numerals represent the elements and wherein.

DETAILED DESCRIPTION OF PREFERRED EMBODIMENTS

Figure 1:
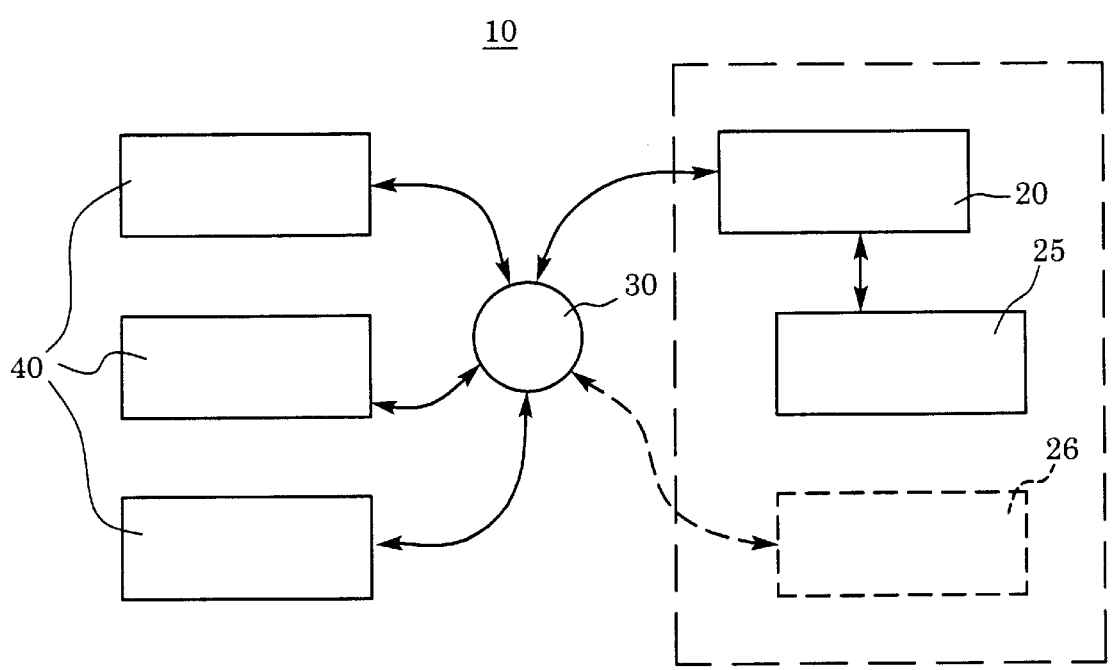
FIG. 1 is a simplified schematic view showing possible connections between elements of a conventional distributed digital image processing system.

For a general understanding of the features of the present invention, reference is made to the drawings, wherein like reference numerals have been used throughout to identify or similar elements. Initially, a system and method for using feedback and feedforward in the generation of presentation images in a distributed digital image processing system in accordance with the present invention will be described with reference to FIG. 2. For purposes of the invention, a distributed digital image processing system generally has at least one output device positioned in a remote location, i.e., where it cannot be conveniently viewed by a customer located at an image originating device.

While the present invention will be described in terms of an illustrative embodiment or embodiments, it will be understood that the invention is adaptable to a variety of distributed digital image processing systems, such that the present invention is not necessarily limited to the particular embodiment or embodiments shown and described herein. On the contrary, the following description is intended to cover all alternatives, modification, and equivalents, as may be included within the spirit and scope of the invention.

The term "image" as used in the disclosure refers to a graphic or plurality of graphics, compilation of text, a contone or halftone pictorial image, or any combination or subcombination thereof, that is capable of being output on a display device, a marker and the like, including a digital representation of such image. For example, an image may be a combination of graphics, text and pictures that is represented by as a series of pixel values denoting the color, intensity, etc., of the particular pixels that make up the image. A special subclass of images are those associated with complete documents, which are hereinafter referred to as "document images." Thus an image may be a document image assembled by a customer at the image originating device, one or more elements of a document image, a "test patch" generated by printing application software or another type of control system, or a member of a collection of images in a database The term "presentation image" as used in this disclosure refers to an image directly visible to human observers that is outputted on an output device (e.g., a marker or a display). A presentation image encompasses a single page image and a multiple page image. The presentation image may include a test pattern, or test patch, that precedes the single page or multiple page image. Depending on the size of a multiple page image, the presentation image may include multiple test patterns or patches interspersed throughout. A presentation image also encompasses multiple copies of a single page or multiple page image. The presentation image may have a test pattern or patch that precedes each copy, depending on the size of the presentation image.

Figure 2:
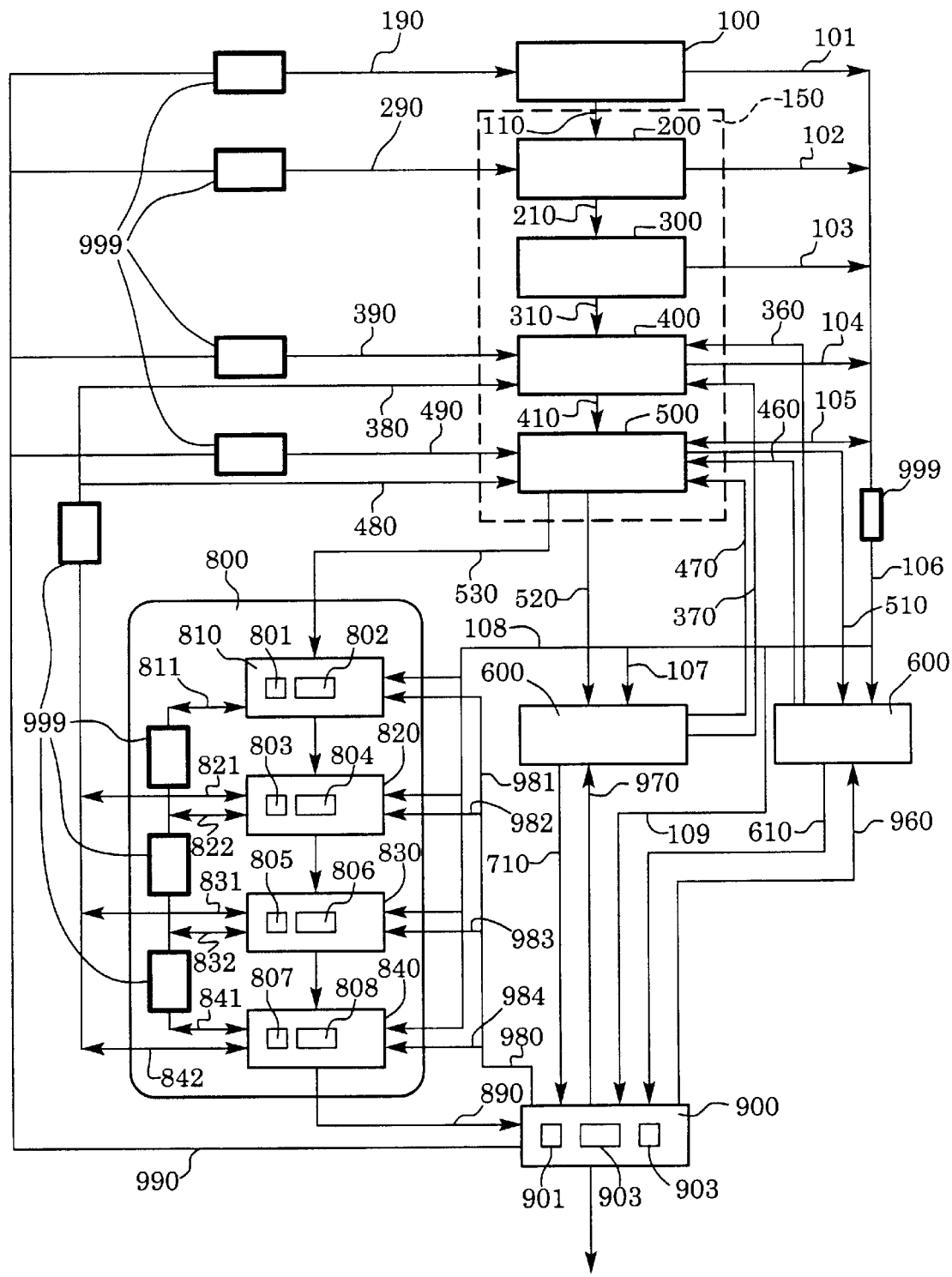
FIG. 2 is a combination flow chart and logical block diagram of a distributed digital image processing system using feedback in the generation of presentation images according to this invention.

FIG. 2 shows a combination logical block diagram and flow chart for a distributed digital image processing system 1000 according to the invention. As shown, the distributed digital image processing system 1000 includes an image originating device 100. The image originating device 100 may be, but is not limited to, a personal computer, a personal digital assistant (PDA), a computer work station, a scanner, a digital copying device or the like. The image originating device 100 is used to assemble an image. For example, the assembling of an image can be achieved by using the image originating device to prepare a script containing pointers (e.g., by use of a token) directed to images stored on data storage devices that are accessible through the distributed digital image processing system 1000. The assembling of an image can also be accomplished, for example, by scanning an image, utilizing software to create an image, or loading an image stored on a removable medium.

In FIG. 2, arrows indicate the flow of information between the image originating device and the media on which a presentation image is ultimately output. The information flow is comprised of three fundamentally different types of data streams: (1) a digital representation of the information (text, pictures, graphics, etc.), (2) a description of how this information is assembled (e.g., a job ticket), and (3) various calibration and control data describing the states of the various devices which might influence the presentation of the information, such as gamut information, color information (e.g. toner levels), media properties (e.g., humidity, thickness, optical properties, etc.), state properties (e.g., paper out, offline, power off, etc.) and the like. This invention primarily focuses on the digital representations of images and the control data of the processing devices and the output devices. Information contained in the job ticket (the description of how the information is assembled) may be used to decide how to implement the actual adjustments. Job tickets may contain customer preferences, draft as final copy, paper stock to be used, etc., that may assist the implementation in making parameter adjustments.

The distributed digital image processing system 1000 also includes image processing devices 200, 300, 400, 500. The image processing devices can include image converters, image transmitters, images storage devices and/or image rendering devices that process the assembled image for output as a presentation image. The system 1000 may have none, one or a plurality of each of the above devices. For example, the system shown in FIG. 2 may have two image converters 200, 400, an image transmitter and/or image storage device 300, and an image rendering device 500.

The image processing devices 200–500 are coupled together via communication links 110, 210, 310, 410. The links may be any type of link that permits the transmission of data, for example, direct serial connections, a local area network (LAN), a wide are network (WAN), a network of networks such as the Internet and the World Wide Web (WWW), a metropolitan area network (MAN), a satellite communication network, an infrared communication network, circuit wirings, and the like. Therefore, the image processing devices 200, 300, 400, 500 may optionally reside on a single physical structure, for example, a central server 150 (indicated by the broken line in FIG. 2), or they may reside on multiple structures situated in remote locations, as long as they are connected by one or more of the aforementioned links. Further, the image rendering device 500 often resides within the output device with which it communicates.

As shown in FIG. 2, the distributed digital processing system 1000 also includes a plurality of output devices 600, 700, 800. Information flow paths 510, 520, 530 represent the flow of the digital representation of the information (text, pictures, graphics, etc.) and the description of how this information is to be assembled. Output device 600 is a video display, output device 700 is a direct marker and output device 800 is an indirect marker. Therefore, the rendering device 500 must perform a different transformation of the digital image to the presentation image for each of the different output devices 600, 700, 800. In the event that there are more than three output devices, the rendering device 500 may have to perform a different transformation for each output device. Alternatively, each output device 600, 700, 800 may have its own associated rendering device.

The video display 600 may be any device known the art including, but not limited to a cathode ray tube (CRT) device, a first panel display, a computer monitor and other such display devices. The direct marker 700 may be any marking device known in the art, e.g., a printer that prints an image directly from digital form to an output media. Thus, the direct marker 700 includes devices such as, but not limited to, ink jet printers, bubble jet printers, thermal transfer printers, dye sublimation printers and the like. The indirect marker 800 may be any device known in the art that outputs an image on an imaging medium at an imaging station 810, develops the image at a developing station 820, transfers the image to an intermediate medium or an output medium at a transfer station 830, and finishes the image at a finishing station 840.

For example, the indirect marker 800 may be a lithographic printer, in which case an image is formed on a lithographic plate (e.g., directly by a laser) at the imaging station 810, the image is developed at the developing station 820 by inking a lithographic plate, the image is transferred to an intermediate blanket at the transfer station 830, and the image is transferred to an out medium at the finishing station 840. In the case of a Xerographic printer, an image is formed on a photoreceptor at the imaging station 810, the image is developed at the developing station 820 by supplying toner to the photoreceptor, the image is transferred to an output medium at the transfer station 830, and the image is fused to the output medium at the finishing station 840. This class of marker includes those using transfer of the image from the imaging medium (e.g., a photoreceptor or a lithographic plate) to one or more intermediate media (e.g., transfer belts, intermediate blankets or drums) prior to its ultimate transfer to the output medium. For clarity, details of the multiple variations of intermediate transfers are not shown. Similarly, additional finishing stations 840 may be used, for example, ink drying stations in lithography and paper conditioning stations in Xerography. These also are not shown for clarity. Thus, the indirect marker 800 includes devices such as, but not limited to, lithographic printers, xerographic printers, ionogrpahic printers, liquid immersion printers and the like.

Output device 800 is described as having a complex internal structure. Output devices 600 and 700 may likewise possess their own internal complexity and corresponding internal parameters. These internal parameters may be, in like manner to those of output device 800, fed back to the processing functions 400 and 500. Information flow paths 360, 370, 460, 470 represent the flow of these feedback data.

The output devices 600, 700, 800 can be located remote from or proximal to the originating device 100 and each other. Multiple devices of any of these three types can exist in a given distributed digital image processing system. In any given implementation of a digital image processing system in accordance with the invention, one or more of the above devices 100–800 may be absent.

The distributed digital image processing system 1000 shown in FIG. 2 also includes a measurement device 900 that can measure image data and various other properties of the presentation image appearing on the output media or it can measure data about the output device itself. The measurement device 900 may include one or more sensors 901–903 such as colorimetric sensors, optical sensors such as spectrophotmeters as spectral sensors of the color, and/or the optical densitometers measuring densities of the printed images, scanners, digital cameras, broadband optical sensors and the like, capable of detecting image data values from a presentation image. The three sensors 901–903 shown in FIG. 2 are merely exemplary. Moreover, the raw data generated by the sensors 901–903 usually will be processed locally within the measurement device 900 or the sensors themselves (e.g., smart sensors). The resulting processed data, as well as the data themselves, are referred to generically as the "properties determined by the sensors." It should be appreciated than any number of sensors considered necessary to achieve the expected results of the system may be implemented. In a preferred embodiment, the measurement device supplies the detected image data as well as properties determined by the sensors to the distributed digital image processing system 1000. Alternatively, the measurement device may provide device-dependent data (e.g, optical densities for extracting tone reproduction curves) to one or more of the devices connected to the distributed digital image processing system 1000.

For example, the measurement device 900 may include a spectrophotometer to sense the actual output spectra of a presentation image on a video display or on output media. A spectrophotometer measures the color spectral components of a set of local areas in the presentation image. Commercially available spectrophotmeters are potentially suitable for marking device applications. The measurement device 900 may also include a colorimeter (e.g. a RGB sensor). A RGB sensor senses red, green and blue values of a set of local areas on a presentation image. Alternatively, a sensor configured to sense more color values could be used.

One or more of the sensors 901–903 may also be of the type capable of detecting properties, characteristics, and at the state of the remote output devices, for example, memory usage, color rendition dictionary parameters, process control system parameters, available gamut, and the like. A color rendition dictionary described a multi-dimensional color transform used in the image processing modules to convert, for example, red, green, blue (RGB) or $L^*, a^*, b^*$, continuous tone values into, for example, cyan, magenta, yellow, black (CMYK) continuous tone values.

Further, sensors may reside within an output device 600, 700, 800 or separate from the output devices whose presentation images the measurement device will assess. Links 610, 710, 890 represent the data coupling between each respective output device 600, 700, 800 and the measurement device 900. Each sensor detects various characteristics of the presentation images appearing on the output media. For example, a spectrophotometer or a colorimeter measures the color of a set of local areas as rendered on the output device 600, 700, 800. These sensors could be placed external to the output device as a retrofit to an existing output device. Sensors also could be located internal to the output device to be used, for example, to measure the toner concentration in a xerographic marking engine. Internally placed sensors also can be used to measure charge on a photoreceptor or toner mass on the unfused media, etc.

The measurement device 900 processes the sensed characteristics of the presentation images and of the output devices 600, 700, 800, and provides feedback information to the processing devices 200, 400, 500, as well as the image originating device 100 of the digital information processing system 1000.

As shown in FIG. 2, information flow paths 960, 970, 980, 990 represent the flow of feedback information from the measurement device 900 to the output devices 600, 700, 800, the image originating device 100, and the processing devices 200, 400, 500 of the digital image processing system 1000. These paths represent the flow of feedback information regarding image data or other image properties measured on the output media after the conclusion of internal processing by the output device 600, 700, 800. For example, path 960 provides feedback information from the measurement device 900 on the basis of measured image properties on the final presentation media, such as the RGB values of patches in a test pattern displayed on a display screen and density, saturation and background of the image. This feedback is used by the video display 600 to re-calibrate the video display 600 by resetting display elements in the video display 600 on the basis of the measured image properties on the final presentation media such that the presentation image matches the assembled image on the image originating device 100.

Information flow path 970 represents the flow of feedback information from the measurement device 900 to the direct marking device 700. This feedback information results in modification of the marking elements of a direct marking device 700, for example, drive voltages in an ink-jet device, based on the measured properties of the presentation image output on the final media as determined by the measurement device 900. Information flow paths 980–984 indicate the flow of feedback information to elements within the direct marking device 800. This feedback information is used to modify the marking elements at the imaging station 810 (e.g., on the receptor or lithographic plate itself or the image (neither one shown)), the developed station 820, the transfer station 830, and/or the finishing station 840 based on the measured properties of the presentation image on the output media.

Information flow paths 811, 821, 831, 841 are internal information flow paths within the indirect marker 800. These paths 811, 821, 831, 841 provide information taken from the imaging station 810, the developing station 820, the transfer station 830 and the finishing station 840, respectively. (The aforesaid stations 810, 820, 830, 840 are hereinafter referred to generically as "image development stations.") In certain indirect marking technologies (e.g., lithography) there may be multiple transfer stations 830 prior to the finishing station 840, but the considerations given here still apply. In order to provide this information, the indirect marker is equipped with sensors 801–808 at the stations 810–840 within the indirect marker 800. The eight sensors 801–808 shown in FIG. 2 are merely exemplary. It should be appreciated that any number of sensors considered necessary to achieve the expected results of the system may be implemented. These sensors may include, but are not limited to optical sensors, colorimetric sensors, RGB sensors, scanners, digital cameras, spectrophotmeters, pixel counters, electrostatic voltmeters, extended toner area coverage sensors (ETACS), black toner area coverage sensors (BTACS), densitometers and microdensitometers, toner mass sensors, temperature sensors, infrared densitometers (IRDs), conductivity sensors, humidity sensors, weight sensors, partial pressure sensors and the like. The optical and colorimetric sensors operate the same as those described above with respect to the measurement device 900.

One of the sensors 801–808 may be an electrostatic voltmeter or the like that senses the voltage of a signal representing an image at any stage of image development by an indirect marker 800. Another one of the sensors may be an optical or mechanical sensor that measures one or more of the internal parameters of the output device. The properties sensed by the microdensitometers, toner mass sensors and temperature sensors are self-explanatory.

The feedback information provided via paths 811, 821 described image properties, such as the electrical or optical properties of an image, which are used to set marking elements in the processing of the imaging station either during or before the writing of the image on an imaging member (not shown) and in the processing of the developing station. A path 831 provides feedback information regarding image properties measured after developed, but prior to transfer either to another internal image acquisition medium or to the final output medium. In addition, image properties measured on the media prior to the final processing of the image (e.g., properties of the transferred but unfused image in an image-on-image xerographic device or of the ink image on the intermediate blanket in a lithographic press) are fed back via a path 841 to the marking elements defining prior states of the image in the marking process. This also is the case for multiple internal transfers (e.g., in the case of multiple lithographic blankets) prior to the final image setting step even though these are not indicated explicitly in FIG. 2. These images and/or their properties can be used to set the characteristics of the marking elements used in any of these prior process steps. Also, feedforward information from upstream process elements of the indirect marker 800 (e.g., pixel count of the image to be output) are channeled to the downstream substations of the indirect marker 800 in order to inform them of conditions affecting their performance. Thus, behavior adjustments in the affected image development stations may be made in order to prepare these affected substations for the conditions they will subsequently encounter.

In FIG. 2, blocks 999 represent computational elements that perform processing functions to convert feedback information from sensor data measurements into suitable control signals to be used by the various processing devices 100, 200, 400, 500, 810, 820, 830, 840. These structural devices 999 could share information during processing and may appear as one processing device with multiple inputs and multiple outputs (not shown). Thus, once a signal is sensed (and perhaps processed) by one of the above-described sensors 901–903, 801–808, the resulting properties determined by the sensors are fed back or fed forward to other stages of the distributed digital image processing system 1000. The structural devices 999 convert the properties determined by the sensors to meaningful digital signals that are usable by each respective process of the system. The processing devices 200, 400, 500, 810, 820, 830, 840 then make use of the converted signals to modify one of the digital representations of the assembled image or to adjust the processing elements of the processing device to ensure that the presentation image matches the image assembled at the image originating device. With respect to the image originating device 100, the converted feedback signal is provided to a customer at the image originating device 100 so that the customer can manually adjust the assembled image to produce a presentation image that appears as desired by the customer.

As shown in FIG. 2, information flow paths 390, 490 represent information feedback loops providing information based on the measured characteristics of the final physical image on the output media. Processors 999 process the properties determined by the sensors coming from the measurement device 900 into a form that is unable to the image converter 400 and rendering device 500. Depending on the detailed implementation, the processors 999 may not occur separate from the converter 400 or the image rendering device 500. As a result, one or more digital representations of the customer image, as defined above, hereafter called "digital images", are modified by the image converter 400 and/or the image rendering device 500. The path 490 results in modifications of the final imaging station (e.g., the characteristics of halftone patterns generated in the rendering step) based on measured properties of the presentation image on the output media. Path 390 results in the use of measured properties of the presentation image on the output media to modify intermediate digital images or their processing, e.g., the modification of tone reproduction curves used in generating device specific contone images from device independent contone images obtained from the image transmission process.

Information flow paths 380, 480 represent the feedback information provided to the image converter 400 and the image rendering device 500 by the image developer 820, the image transfer station 830 and the image finishing stain 840, via paths 822 832, 842, respectively. This feedback information is used to modify the digital images based on image characteristics from the intermediate physical images on the receptor, intermediate media or final output during processing by the indirect marker 800.

Information path 190 represents the flow or feedback information from measurement device 900 to the image originating device 100. Thus, the measured properties of the presentation image on the final media can be used to permit the originating customer or an automatic system to view or sense and/or modify a representation of the image assembled and displayed on the image originating device 100 showing how the final output image appears once it has been outputted on an output device 600, 700, 800. Information path 290 represents the flow of the same feedback information to the image converter 200. Thus, the measured properties of the presentation image can be used by the image converter to automatically modify the presentation image so that the presentation image appearing on the output device 600, 700, 800 matches the image appearing on the image originating device 100.

In operation, an image is assembled on the image originating device 100 of the distributed digital image processing system 1000. The image may be assembled with a graphic or paint application, scanning, or the like. The image also may be assembled by specifying pointers to reference digital images residing on databases elsewhere in the system 1000. At this state, the assembled image usually consists of digital image data that is encoded in a device or application specific representation of the assembled image. When the originating customer decides to send the image to an output device to be output as a presentation image, if necessary, the original assembled image is converted by an image convertor 200 to a device-independent image representation, for example, CIELab or any other such known type of digital image data, such as CIELuv and YCC. CIELab utilizes a color space in which the values $L^*$, $a^*$ and $b^*$ are plotted to form an orthogonal, 3-dimensional coordinate system. Equal distances in the space approximately represent perceived equal color differences.

The device independent image representation is then transmitted, via the image transmitter 300, to a second image converter 400 that converts the device-independent digital image representation to an output-device-dependent representation of the assembled image, for example, a CMYK contone or any other such known type of device-dependent digital image representation. Next, the image rendering device 500 prepares the device dependent data for output on the selected output device 600, 700, 800, for example, by converting the CMYK contone image to a halftone equivalent.

When the presentation image is outputted by one or more of the output devices, the sensors 901–903 of the measurement device 900 perform colorimetric sensing, optical sensing, and the like, of the presentation image on the final media. Signals generated by the sensors 901–903, referred to as properties determined by the sensors, representing the measured characteristics of the presentation image, are then fed back to the appropriate output device 600, 700, 800 via paths 960, 970 and 980, respectively. The output device 600 can then automatically re-calibrate itself through use of the measured properties of the presentation images presented on the video display 600, or the direct and indirect markers 700, 800 can modify their marking elements, for example, drive voltages in an ink-jet printer or an imaging station of an indirect marker, based on the measured characteristics of the printed presentation image. Alternatively, each output device can have its own local measurement device so that measurements of the presentation image outputted by a direct marker 700 fed back to the display 600 and used for its calibration.

As previously described, the presentation image could be a single or multiple page image and may be preceded by a test pattern. Thus, the measurement device 900 can sense and measure characteristics of the test pattern and provide feedback information to the appropriate output device so that the output device can be adjusted and/or re-calibrated to modify the presentation image before outputting the portion of the presentation image still to be outputted. In the case of a large-sized presentation image, test patterns may be interspersed throughout. Therefore, the measurement device can provide feedback information to the output devices at appropriate intervals in order to enable a control system to prevent drift or degradation during the outputting of the presentation image. In the event of a presentation image including multiple copies of a large-sized image, a test pattern may precede each copy (or any other user-preferred interval). In yet another situation, a single page (or other small-sized) presentation image may itself be used as the test pattern, and the measured properties of the presentation image can be fed back to the appropriate output device for adjustment and/or re-calibration before outputting of subsequent presentation images.

If an image is output by an indirect marker 800, the indirect marker 800 entails additional processing steps before generating the presentation image from the rendered representation of the incoming digital image. Sensors 801–808 positioned at the imaging station 810, developing station 820, transfer station 830 and finishing station 840 detect characteristics of the image at these various stations of generation of the presentation image. The measured properties of the image at these various image development stations are then fed back and/or fed forward within the indirect marker 800 to modify the marking elements at each station within the indirect marker 800. The feedforward information could be used to adjust and/or re-calibrate for the same portion of the presention image having its properties measured, as well as subsequent portions of the presentation image. The feedback information would be used to adjust and/or re-calibrate for subsequent portions of the presentation image or subsequent presentation images, as discussed above with respect to the measurement device.

Additionally, the measured properties of the image at the developing station 820, transfer station 830 and finishing station 840 are fed back to the second image converter 400 and the image rendering device 500 via paths 380 and 480, respectively. The image converter 400 and/or the image rendering device 500 modify the digital representation of the assembled image based on the measured properties of the image at these various stages of generation of the presentation image. The feedback information would be used to modify subsequent portions of the representation of the assembled image or subsequent representations of assembled images, as discussed above with respect to the measurement device.

In addition, the signals generated by the sensors of the measurement device 900 representing the properties of the presentation image on the output media are fed back to the image convertors 200, 400 and the imgae rendering device 500. Thus, the image converter 400 and/or the image rendering device 500 can modify the digital representation of the assembled image based on the measured properties of the presentation image on the output media. Again, the feedback information would be used to modify subsequent portions of the representation of the assembled image or subsequent representations of assembled images, as discussed above with respect to the measurement device.

The above-described feedback paths result in automatic adjustment of one or more digital representatives on the assembled image at various stages of the distributed digital image processing system 1000. Additionally, the distributed digital image processing system 1000 of this invention accommodates manual adjustment of the assembled image by the originating customer to ensure that a particular remote output device outputs a presentation image matching a simulated output of the presentation image, locally accessible to the originator.

In order to effectuate manual adjustment, the measurement device 900 provides feedback to the image originating device 100 via information flow paths 990 and 190. The image originating device 100 reproduces the presentation image so that a customer can view a simulated output of the presentation image and adjust the image so that the presentation image is output as desired by the customer. This can be approximated by suitable calibrating the display of an image originating device 100. To get the accuracy required by the graphic arts industry, however, a calibrated proximal printer 25 or 26 may be used to output the presentation image on the chosen medium.

In additon, the distributed digital image processing system may include the capability of detecting properties of the assembled image or a representation of the assembled image at the image originating device 100 and/or the image processing devices 200, 300, 400, 500, respectively. The system then provides feedforward information, via flow paths 101–109, to the output devices 600, 700, 800 so that the respective output device can prepare itself for the forthcoming presentation image, and to the measurement device 900 so that the measurement device an accurately process the sensed data to produce the measured image properties. In addition, in the embodiment shown in FIG. 2, the feed forward information from the image originating device 100 and the image processing devices 200, 300 400 is fed forward to the image rendering device 500, as indicated by the direction of the arrow of flow path 105 pointing toward the image rendering device 500. This allows the image rendering device 500 to prepare for the forthcoming representation of the assembled image.

In summary, this invention is concerned with the use of feedback information from output devices and other intermediate processing devices in a distributed digital image processing system to inform an originating customer, other operator, or an automatic control device of the state and properties of an output device, to modify the digital image at some stage of processing in order to accommodate the state and properties of the output device, and/or to change the state of the output device to produce a presentation image that matches the image appearing at the image originating device.

In one aspect of this invention, the originating workstation queries the remote output devices, via a central server or set of servers, to identify the current capabilities and state of the remote output devices. Then, printing application software on either the image originating device or the center server(s) adjusts the image so as to create a presentation image that matches the image on the image originating device.

In another aspect of this inventoin, real time information from the remote output devices, such as memory, color rendition dictionary parameters, process control system parameters, available gamut, and the like, is fed back to the image originating device to represent how the presentation image will appear on the selected output device. Then, the printing application software could show the originating customer how and where the image characteristics would be distorted on the remote output device. The customer can then compensate for the distortion, e.g., by altering the selection of colors used in the original electronic image or selecting a different remote output device.

In yet another aspect of this invention, the printing application program, residing on either the image originating device or central server, can utilize the feedback information to adjust the electronic original during one or more stages of image processing to achieve the desired appearance of the presentation image on one or more output devices. This approach would make use of appearance matching models to perform the image re-mapping. Any known appearance matching model may be used in the implementation of this invention, for example, CIEAM, other models based on response of the human visual system and the like.

It should be appreciated that the distributed digital image processing system of this invention may be used for job-by-job calibration and/or color correction of one or more output devices and processing devices. It should also be appreciated that the distributed digital image processing system of this invention may be used to enable a customer to specify customer color configurations for a particular output device sot that the parameter sof the output device will be re-set automatically each time that output device is selected to output a presentation image.

It should be appreciated that the distributed digital image processing system of this invention may be used for feeding back properties and state information of one or more output devices to a server or image originating device in order to enable a customer to select an appropriate output device for outputting a presentation image.

It should also be appreciated that the distributed digital image processing system of this invention may be used to allow the user to match the gamuts of multiple output devices on the system so that all output devices distributed on the system output matching color appearances.

It should also be appreciated that the distributed digital image processing system of this invention may also be used to provide feedforward information to the output devices so that these devices can adjust operating parameters so as to optimally render the image information. The feedforward information can also be used to maximize productivity (e.g., by known beforehand that extra cleaning will be needed due to high are coverage, or if yu know the pixel count of the image, by preparing the toner sump to contain enough toner).

Although the processing functions shown in FIG. 2 are described as "devices" herein, it should be appreciated that this is a logical partitioning and that the functions 100–500 attributed to these devices may be incorporated into a single physical entity. Moreover, an output device having a built-in computer may incorporate one or more of the outputting functions 600, 700, 800 as well as one or more of the processing functions 200, 300, 400, 500. Further, in any given implementation of a distributed digital image processing system according to this invention, one or more of these processing functions may be absent.

While the invention is described wherein the processing devices 200–500 are implicitly envisaged as being implemented in hardware, the functions of these devices may be implemented using software executed by a computing device. The image originating device 100, the processing devices 200–500, and the output devices 600–800 can each be implemented on a general purpose or special purpose computer, a programmed microprocessor or microcontroller and peripheral integrated circuit elements, and ASIC or other integrated circuit, a hardware electronic or logic circuit such as a discrete element circuit, a programmable logic device, or the like. In general, any device capable of accomplishing the processing and information flow shown in FIG. 2 can be used to implement the distributed digital image processing system 1000 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A distributed digital image processing system, comprising:

an image originating device on which an image is assembled;

a processing device linked to the image originating device that processes and transmits a representation of the assembled image for outputting;

an output device linked to the processing device that outputs the assembled image as a presentation image; and a measurement device linked to the output device and at least one of the image originating device and the processing device, the measurement device having at least one sensor that detects properties of the presentation image, wherein the properties of the presentation image detected by the measurement device are fed dynamically back to at least one of the image originating device, the processing device and the output device to modify at least one of the assembled image, the representation of the assembled image and the presentation image, respectively.

2. The system of claim 1, wherein the image originating device, the processing device and the output device are linked together by at least on of direct serial connections, a local area network, a metropolitan area network, a wide area network, a network of networks, a satellite communication network, an infrared communication network and circuit wirings.

3. The system of claim 1, wherein the processing device includes at least one of an image converter, an image transmitter and an image rendering device, and wherein the output device is one of a video display, a direct marker and an indirect marker, and wherein the at least one sensor is one of a colorimetric sensor, a spectrophotometer, a RGB sensor, a scanner, a digital camera, a densitometer, a broadband optical sensor, a weight sensor and a partial pressure sensor.

4. The system of claim 1, wherein the at least one of the image originating device, the processing device and the output device modifies the presentation image in accordance with the fed back properties received from the measurement device, and wherein the output device outputs the modified presentation image.

5. The system of claim 1, wherein at least one of the image originating device, the processing device and the output device to which the detected properties are fed back modifies the image, the representation of the assembled image, and the presentation image, respectively, based on the detected properties.

6. The system of claim 1, wherein the measurement device further detects properties of the output device.

7. A distributed digital image processing system, comprising:
- an image originating device on which an image is assembled;
- a processing device linked to the image originating device that processes and transmits a representation of the assembled image for outputting;
- an output device linked to the processing device that outputs the assembled image as a presentation image;
- a measurement device linked to the output device and at least one of the image originating device and the processing device, the measurement device having at least one sensor that detects properties of the presentation image;
- at least one detector positioned at at least one of the image originating device and the processing device; and
- an image rendering device that prepares the processed representation of the assembled for use by the output device, wherein:
  - the properties of the presentation image detected by the measurement device are fed back to at least one of the image originating device, the processing device and the output device,
  - the at least one detector detects properties of the assembled image or the representation of the assembled image, and
  - the properties detected by the at least one of the image originating device and the image processing device are fed forward for use by the at least one of the image rendering device, the output device and the measurement device.

8. The system of claim 1, further comprising:
- a second output device proximally associated with the image originating device.

9. A distributed digital image processing system, comprising:
- an image originating device on which an image is assembled;
- a processing device linked to the image originating device that processes and transmits a representation of the assembled image for outputting; and
- an output device linked to the processing device that outputs the assembled image as a presentation image, the output device having a plurality of image development stations and at least one sensor associated with at least one of the plurality of image development stations that detects properties of the presentation image at the respective image development station of the output device,
- wherein the properties of the presentation image detected by the at least one sensor are fed back to the processing device.

10. The system of claim 9, wherein the properties detected by the at least one sensor are further fed back or fed forward to at least one of the image development stations of the output device.

11. The system of claim 10, wherein the at least one image development station modifies the presentation image in accordance with the fed back or fed forward properties detected by the at least one sensor, and wherein the output device outputs the modified presentation image.

12. The system claim 10, wherein the processing device includes at least one of an image converter, an image transmitter and an image rendering device, and
   wherein the at least on sensor is one of a colorimetric sensor, a spectrophotometer, RGB sensor, a scanner, a digital camera, a pixel counter, and electrostatic voltmeter, an extended toner area coverage sensor, a black toner area coverage sensor, a densitometer, a toner mass sensor, a temperature sensor, a conductivity sensor, a humidity sensor, a weight sensor and a partial pressure sensor.

13. The system of claim 9, wherein the image originating device, the processing device and the output device are linked together by at least one of direct serial connections, a local area network, a metropolitan area network, a wide are network, a network of networks, a satellite communication network, an infrared communication network and circuit wirings.

14. The system of claim 9, wherein the processing device modifies the representation of the assembled image in accordance with the fed back properties detected by the at least one sensor, and the output device outputs a modified presentation image.

15. The system claim 9, further comprising:
- at least one detector positioned at at least one of the image originating device and the processing device; and
- an image rendering device that prepares the processed representation of the assembled image for use by the output device,
- wherein the at least one detector detects properties of the assembled image of the representation of the assembled image, and
- wherein the properties detected by the at least one of the image originating device and the image processing device are fed forward for use by at least one of the image rendering device and the output device.

16. The system of claim 9, wherein the image is assembled through a script, the script containing printers to one or more elements that comprise the assembled image, and wherein the processing device utilizes the script to re-assemble a representation of the assembled image suitable for outputting.

17. The system of claim 9, further comprising:
- a measurement device, the measurement device having at least one sensor that detects properties of at least one of the presentation image and the output device,
- wherein the properties detected by the measurement device are fed back to at least one of the image originating device, the processing device and the output device.

18. The system of claim 17, wherein the at least one sensor of the measurement device is one of a colorimetric sensor, a spectrophotometer, a RGB sensor, a scanner, a digital camera, a densitometer, a broadband optical sensor, a weight sensor and a partial pressure sensor.

19. The system of claim 17, wherein the at least one of the image originating device, the processing device and the output device modifies the presentation image in accordance with the fed back properties received from the measurement device, and wherein the output device output the modified presentation image.

20. The system of claim 17, comprising:
- at least one detector positioned at at least one of the image originating device and the processing device; and
- an image rendering device that prepares the processed representation of the assembled image for use by the output device,
- wherein the at least on detector detects properties of the assembled image or the representation of the assembled image, and
- wherein the properties detected by the at least one detector are fed forward for use by at least one of the image rendering device, the output device and the measurement device.

21. A method for outputting a presentation image in a distributed image processing system, comprising:
   assembling an image on an image originating device;
   processing and transmitting a representation of the assembled image for outputting on an output device located remote from the image originating device;
   outputting the assembled image as a presentation image;
   measuring the properties of the presentation image; and
   dynamically feeding back the measured properties for use in the at least one of the assembling step, the processing step and the outputting step to modify at least one the assembled image, the representation of the assembled image and the presentation image, respectively.

22. The method of claim 21, further comprising:
   modifying at least one of the assembled image and the representation of the assembled image based on the fed back properties for output as a modified presentation image; and
   outputting the modified presentation image.

23. The method of claim 21, wherein measuring the properties of the presentation image occurs at at least one of the assembling step, the processing step and the outputting step during the outputting of the presentation image, and
   wherein the properties of the presentation image measured at the at least one of the assembling step, the processing step and the outputting step during the outputting of the presentation image are fed forward to at least one other of the assembling step, the processing step and the outputting step during the outputting of the presentation image.

24. The method of claim 21, wherein at least one of measuring the properties of the presentation image and feeding back the measured properties occurs substantially simultaneously with outputting the presentation image.

25. The method of claim 21, wherein at least one of measuring the properties of the presentation image and feeding back the measured properties occurs after outputting the presentation image is completed.

26. The method of claim 21, further comprising:
   rendering an image by preparing the processed representation of the assembled image for the outputting step; and
   detecting the properties of the assembled image at at least one of the image originating device and the image processing device, and
   wherein the detected properties are fed forward for use in at least one of the image rendering step, the outputting step and the measuring step.

27. A method for outputting a presentation image in a distributed image processing system, comprising:
   assembling an image on an image originating device;
   processing and transmitting a representation of the assembled image for outputting on an output device located remote from the image originating device;
   outputting the assembled image as a presentation image;
   measuring the properties of the presentating image; and
   feeding back the measured properties for use in at least one of the assembling step, the processing step and the outputting step, wherein:
      measuring the properties includes at least one of measuring color spectra in the presentation image, measuring optical properties of at least on local region of the presentation image, measuring an electrostatic voltage of at least one local region of the presentation image during outputting, measuring an amount of colorant used in at least one local area of the presentation image during its prepartion, measuring weight of the presentation image on the medium, measuring chemical emissions from the presentation image, measuring temperature of air in an immediate vicinity of the presentation image and measuring humidity of air in an immediate vicinity of the presentation image, and
   outputting the presentation image includes outputting the presentation image on at least one of a video display, a direct marker, and an indirect marker.

28. A method for outputting a presentation image in a distributed image processing system, comprising:
   assembling an image on an image originating device;
   processing and transmitting a representation of the assembled image for outputting on an output device located remote from the image originating device;
   outputting the assembled image as a presentation image;
   measuring the properties of the presentation image; and
   feeding back the measured properties for use in at least one of the assembling step, the processing step an the outputting step,
      wherein at least one of measuring the properties of the presentation image and feeding back the measured properties occurs at prescribed intervals.

29. A method for outputting a presentation image in a distributed image processing system, comprising:
   assembling an image on an image originating device, wherein assembling the image includes preparing a script containing pointers to one or more elements that comprise the presentation image;
   processing and transmitting a representation of the assembled image for outputting on an output device located remote from the image originating device;
   outputting the assembled image as a presentation image;
   measuring the properties of the presentation image; and
   feeding back the measured properties for use in at least one of the assembling step, the processing step and the outputting step.

30. A distributed digital image processing system, comprising:
   an image originating device on which an image is assembled;
   a processing device linked to the image originating device that processes and transmits a representation of the assembled image for outputting, wherein:
   the image is assembled through a script, the script containing pointers to one or more elements that comprise the assembled image, and
   the processing device utilizes the script to re-assemble a representation of the assembled image suitable for outputting;
   an output device linked to the processing device that outputs the assembled image as a presentation image; and
   a measurement device linked to the output device and at least one of the image originating device an the processing device, the measurement device having at least one sensor that detects properties of the presentation image,
   wherein the properties of the presentation image detected by the measurement device are fed back to at least one of the image originating device, the processing device and the output device.

31. A distributed digital image processing system, comprising:

assembly means for assembling an image;

processing means for processing a representation of the assembled image linked to the processing means;

measuring means for measuring the properties of the presentation image;

feedback means for feeding back the measured properties to at least one of the assembly means, the processing means and the outputting means;

at least one detecting means for detecting properties of the assembled image or the representation of the assembled image, the detecting means positioned at at least one of the assembly means and the processing means; and an image rendering means for preparing the processed representation of the assmelbed image for use by the output device;

wherein the properties detected by the detecting means are fed forward for use by at least one of the image rendering means, the outputting means and the measuring means.

32. A distributed digital image processing system, comprising:

assembly means for assembling an image;

processing means for processing a representation of the assembled image linked to the processing means;

outputting means for outputting the assembled image as a presentation image linked to the processing means;

measuring means for measuring the properties of the presentation image; and feedback means for dynamically feeding back the measured properties to at least one of the assembly means, the processing means and the outputting means to modify at least one the assembled image, the representation of the assembled image and the presentation image, respectively.

33. The system of claim 32, wherein at least one of the assembly means, the processing means and the outputting means to which the measured properties are fed back modifies the image, the representation of the assembled image, and the presentation image, respectively, based on the measured properties.

* * * * *